Patented May 8, 1945

2,375,601

UNITED STATES PATENT OFFICE 2,375,601

MAGNESIUM WELDING ROD

Ludwig J. Weber and George F. Sager, New Kensington, Pa., assignors to Aluminum Company of America, Pittsburgh, Pa., a corporation of Pennsylvania No Drawing. Application October 4, 1943,
Serial No. 504,960

4 Claims. (Cl. 219—8)

This invention concerns the welding of articles or structural members composed of magnesium and alloys wherein this metal predominates. The invention more particularly relates to the composition of a welding rod suitable for such welding operations.

In the welding of magnesium and magnesium alloy articles where a welding rod is employed to supply filler metal to the joint it has been the general practice to use a rod having the same composition as the parent metal, i. e., the article or member being welded. Although this practice has been satisfactory for many purposes, it has the disadvantage of requiring the maintenance of a stock of different rods in a welding shop with the attendant possibility of confusion and use of the wrong kind of rod for a given welding operation. This practice also has the disadvantage of requiring the use of an alloy which may have inferior welding characteristics, thus rendering welding more difficult and expensive. For example, the familiar welding rod alloy consisting of magnesium and 1.5 per cent manganese tends to crack during solidification of the weld bead in making some welded joints with the result that the welded article fails to pass inspection standards. Furthermore, welded joints made with the rods of the proper composition with respect to the parent metal sometimes fail to meet special requirements such as that of resistance to leakage of a liquid. Still another important factor in making welded joints is the demand for speed. While known welding rods might be suitable in a given case if sufficient time were allowed for the welding operation, yet it would not be commercially practicable to devote the required length of time to the operation if a high production schedule must be maintained. The demand for the greatest possible number of welded assemblies per hour or per day has placed a premium on means for shortening the welding operation without decrease in quality of the joint.

Our invention, in general, is directed to improving the quality and speed of welding magnesium and magnesium base alloy articles, and its particular objective is the provision of a welding rod which has more general application than those heretofore employed. Another particular purpose is to provide a rod which produces a sound joint which is relatively free from cracks.

We have discovered, as a result of an extensive investigation, that a welding rod consisting of a magnesium base alloy containing from 0.5 to 3 per cent aluminum, 0.2 to 0.8 per cent manganese, and which is free from zinc except as an impurity, produces joints of consistently high quality. Welding rods made from this alloy have been found to be superior to those composed of magnesium and 1.5 per cent manganese in making joints, especially in respect to producing welded joints relatively free from cracks. Since the character of the joints differs somewhat in different welded assemblies, some assemblies being more difficult to weld than others, the tendency for cracks to occur will be greater in some cases than in others. Where our improved rod is used, however, there is a marked decrease in the cracking tendency to the extent that few cracks, if any, appear, and hence it is considered that the joints are relatively free from cracks. Our new welding rod is also superior to those made of alloys having high aluminum contents and containing zinc since it does not have the fluidity in the molten condition which characterizes the latter type of alloy although it possesses sufficient flowability to form a good joint. High fluidity is often undesirable in the welding of magnesium articles since it promotes a spreading of the filler metal and makes it difficult to confine the molten metal to the joint where it is wanted. The lower fluidity of our alloy promotes the rapid formation of a welded joint and thus permits an increase in the speed of a given welding operation. Still another factor which serves to increase the speed of welding with the improved rod is the ability of the molten alloy to bridge the space between the members being joined, particularly where the space is wider than normally allowed. Our alloy does not fall through such an enlarged space but remains therein and solidifies without cracking. We consider that this is one of the most important properties of the alloy.

The new welding rod composition herein described can be successfully employed in welding different magnesium base alloys, that is, its use is not confined to joining members composed of one alloy. In this respect it may be said to have a wider field of utility than general practice heretofore would indicate as possible or desirable.

To achieve the foregoing advantages the composition of the alloy must be closely controlled. For example, the aluminum content should not be less than 0.5 per cent if adequate fluidity is to be attained, while on the other hand more than 3 per cent of this element produces too great a fluidity. Preferably the aluminum content should be kept between about 1 and 2 per cent. The manganese content must be kept within the range of 0.2 to 0.8 per cent in order to attain the desired fluidity and solidification characteristics of the alloy. Generally, the amount of manganese used should increase as the aluminum content increases. In our preferred practice the range for manganese lies between 0.25 and 0.6 per cent. Although satisfactory joints can be made using a welding rod alloy containing the usual amount of iron impurity occurring in magnesium, we have found that consistently better results are obtained, especially with respect to relative freedom from cracking of the joints, if the iron content of the alloy is limited to less than 0.005 per cent. Where difficulty is experienced in making crack-free welded joints, it has been observed that a very low iron content, less than 0.005 per cent, is effective in either eliminating the cracks or greatly minimizing their occurrence.

Inasmuch as the presence of zinc in the welding rod alloy contributes materially to the extension of the freezing range of the alloy and its fluidity, we have found it necessary to exclude this element from our composition except as it may occur as an unavoidable impurity. Because of the relative absence of zinc from our alloy it is herein referred to as being a zinc-free composition:

Other elements than those mentioned hereinabove may be included in the welding rod alloy to enhance particular properties of the rod or of the welded joint produced therefrom, but in no case should the added elements be subversive to the basic properties which characterize our novel composition. Thus elements may be included in the alloy which refine the grain size thereof, minimize the oxidation, or alter the solution potential. Elements employed for this purpose are generally used in small amounts. The presence of such elements and any others not subversive to the alloy are comprehended in the expression, balance substantially magnesium, as employed in the appended claims.

The welding rod made of the new alloy may be employed in any welding operation where rods are normally used, such as in torch welding or arc welding. Also, the customary fluxes or other protective means should be used to avoid burning of the molten metal.

The improvement gained through use of the new welding rod is illustrated in the following examples where a fitting of a cast magnesium base alloy containing 1.5 per cent manganese was welded to a sheet of the same composition.

A conventional welding rod of the same composition as the fitting and sheet was used, together with a commercial flux. The welding was done with an oxy-acetylene flame. The welded joint showed several cracks and presented an unsightly appearance which would cause rejection of the article. When the same joint was made under the same conditions with a magnesium base alloy containing 1.5 per cent aluminum, 0.4 per cent manganese, less than 0.005 per cent iron, and free from zinc, no cracks were observed. Furthermore, in a leakage test wherein an air pressure of 5 pounds per square inch was applied to the welded assembly, the joint made with the conventional welding rod exhibited several leaks while the other joint did not leak.

Having thus described our invention and one embodiment thereof, we claim:

1. A welding rod composed of a zinc-free magnesium base alloy containing from 0.5 to 3 per cent aluminum, and 0.2 to 0.8 per cent manganese, the balance being substantially magnesium.

2. A welding rod composed of a zinc-free magnesium base alloy containing from 1 to 2 per cent aluminum, and from 0.25 to 0.6 per cent manganese, the balance being substantially magnesium.

3. A welding rod composed of a zinc-free magnesium base alloy containing from 0.5 to 3 per cent aluminum, 0.2 to 0.8 per cent manganese, and less than about 0.005 per cent iron as an impurity, the balance being substantially magnesium.

4. A welding rod composed of a zinc-free magnesium base alloy containing from 1 to 2 per cent aluminum, 0.25 to 0.6 per cent manganese, and less than about 0.005 per cent iron as an impurity, the balance being substantially magnesium.

LUDWIG J. WEBER.
GEORGE F. SAGER.